United States Patent
Li et al.

(10) Patent No.: US 11,181,712 B2
(45) Date of Patent: Nov. 23, 2021

(54) LENS MODULE AND ELECTRONIC DEVICE HAVING THE SAME

(71) Applicant: TRIPLE WIN TECHNOLOGY (SHENZHEN) CO. LTD., Shenzhen (CN)

(72) Inventors: Kun Li, Guangdong (CN); Long-Fei Zhang, Guangdong (CN); Shin-Wen Chen, New Taipei (TW); Hao-Zhong Liu, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 202 days.

(21) Appl. No.: 16/561,425

(22) Filed: Sep. 5, 2019

(65) Prior Publication Data

US 2020/0218028 A1 Jul. 9, 2020

(30) Foreign Application Priority Data

Jan. 3, 2019 (CN) .......................... 201910005300.1

(51) Int. Cl.
*G02B 7/02* (2021.01)

(52) U.S. Cl.
CPC .................................... *G02B 7/022* (2013.01)

(58) Field of Classification Search
CPC ........... G02B 7/021–7/028; G02B 7/06; F21V 31/005
USPC .......... 277/354; 359/829–830; 362/645, 267, 362/158; 285/351
See application file for complete search history.

(56) References Cited

U.S. PATENT DOCUMENTS

| 2,246,436 | A | * | 6/1941 | Downey | F16L 15/008 285/347 |
| 3,796,098 | A | * | 3/1974 | Trayer | G01F 23/2922 73/327 |
| 3,879,071 | A | * | 4/1975 | Gockler | F16L 15/008 285/347 |
| 5,207,502 | A | * | 5/1993 | Maglica | F21L 4/005 137/859 |
| 5,260,858 | A | * | 11/1993 | Maglica | F21L 4/005 362/205 |
| 5,398,498 | A | * | 3/1995 | Mort | F02K 9/38 60/223 |

(Continued)

FOREIGN PATENT DOCUMENTS

| CN | 201548737 U | 8/2010 |
| CN | 203858405 U | 10/2014 |
| TW | M459362 | 8/2013 |

*Primary Examiner* — Zachary W Wilkes
(74) *Attorney, Agent, or Firm* — ScienBiziP, P.C.

(57) ABSTRACT

A lens module includes a lens holder and a lens. The lens holder comprises a through-hole. The lens holder comprises an inner wall surrounding to define the through-hole. A first thread is formed on the inner wall. A second thread is formed on an outer sidewall of the lens. The first thread cooperates with the second thread to fix the lens on the lens holder. At least one first slot is defined on the outer sidewall of the lens and around a periphery of the lens, and a seal ring is received in each first slot. At least one second slot is defined on the outer sidewall of the lens along a direction of an optic axis of the lens. Each second slot passes through each first slot to form a receiving space. The disclosure also provides an electronic device having the lens module.

20 Claims, 6 Drawing Sheets

(56) References Cited

U.S. PATENT DOCUMENTS

| | | | | |
|---|---|---|---|---|
| 6,616,297 B1* | 9/2003 | Chen | ............ | F21V 19/047 |
| | | | | 362/206 |
| 6,785,053 B2* | 8/2004 | Savage, Jr. | ............ | G02B 7/022 |
| | | | | 359/642 |
| 6,985,313 B1* | 1/2006 | Savage, Jr. | ............ | G02B 7/022 |
| | | | | 359/811 |
| 7,855,847 B2* | 12/2010 | Kawasaki | ............ | G02B 13/04 |
| | | | | 359/830 |
| 7,929,225 B2* | 4/2011 | Sasaki | ............ | G02B 7/021 |
| | | | | 359/819 |
| 8,675,127 B2* | 3/2014 | Nakajima | ............ | H04N 5/2253 |
| | | | | 348/374 |
| 8,931,992 B2* | 1/2015 | Seiter | ............ | F16B 33/002 |
| | | | | 411/366.1 |
| 9,019,378 B2* | 4/2015 | Nakajima | ............ | G02B 13/001 |
| | | | | 348/148 |
| 9,176,298 B1* | 11/2015 | Gustafson | ............ | G02B 7/008 |
| 9,574,760 B1* | 2/2017 | Olsson | ............ | H05B 45/56 |
| 9,857,553 B2* | 1/2018 | Horiuchi | ............ | H04N 5/2257 |
| 2005/0104995 A1* | 5/2005 | Spryshak | ............ | G02B 7/026 |
| | | | | 348/360 |
| 2016/0124290 A1* | 5/2016 | Bergreen | ............ | G02B 13/001 |
| | | | | 396/533 |

* cited by examiner

LENS MODULE AND ELECTRONIC DEVICE HAVING THE SAME

FIELD

The subject matter herein generally relates to a lens module and an electronic device having the lens module.

BACKGROUND

Lens modules are commonly used to in electronic devices. The lens module generally includes a lens, a lens holder, a filter, a photosensitive chip and a circuit board. In the design of the lens module, the lens and the lens holder are mostly screwed together, and the torque required to connect the fastening lens and the lens holder mainly comes from the friction and extrusion of the screw. During the connection between the lens and the lens holder, due to the precision of the lens and the lens holder and the material, the torque between the lens and the lens holder may be unstable, which may cause the lens to run out of focus and affect an optical quality of the lens module.

BRIEF DESCRIPTION OF THE DRAWINGS

Implementations of the present disclosure will now be described, by way of embodiments, with reference to the attached figures.

DETAILED DESCRIPTION

Figure 1:
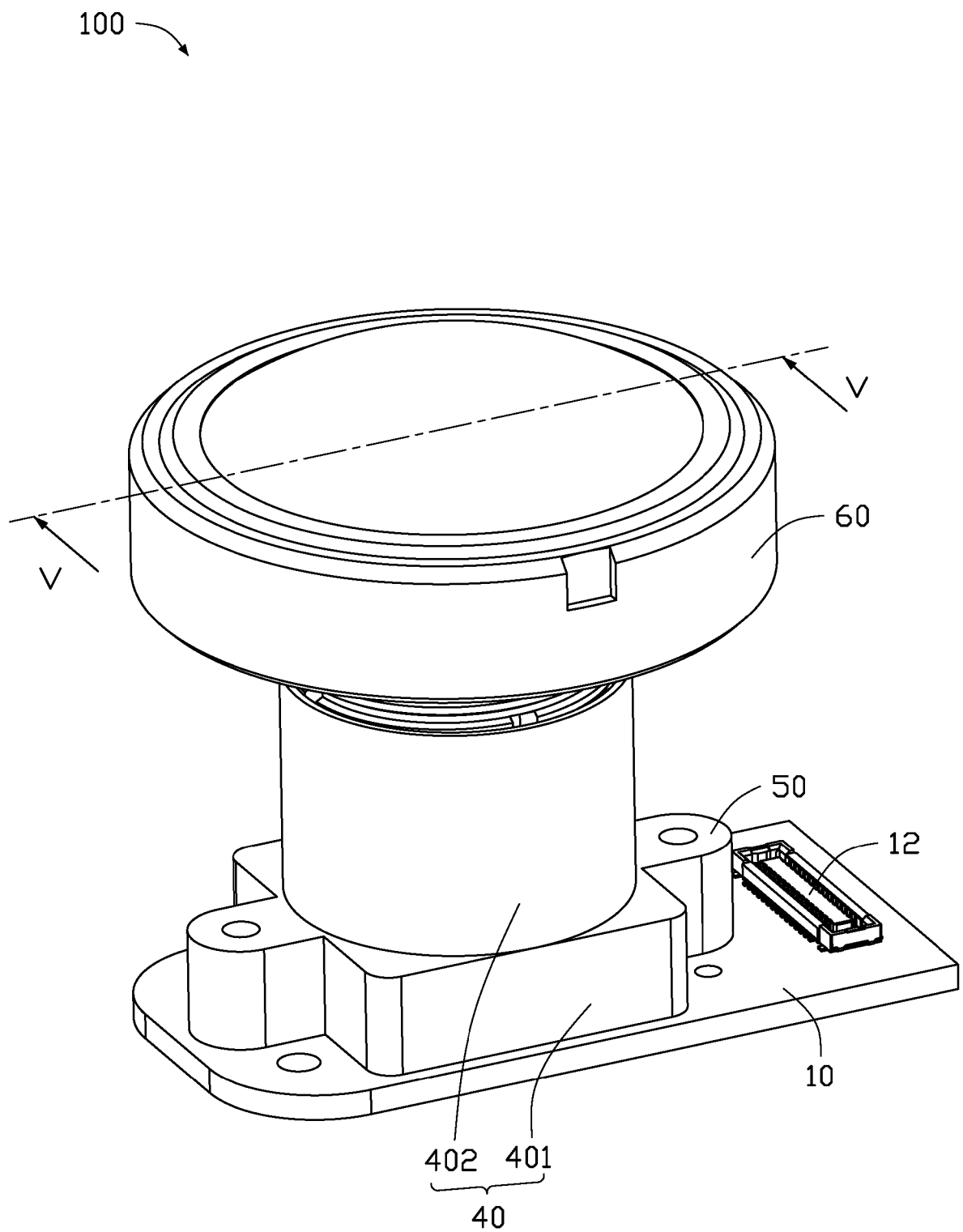
FIG. 1 is a diagram of an embodiment of a lens module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a lens module 100. The lens module 100 includes a circuit board 10, a filter 30 (shown in FIG. 2), a lens holder 40 and a lens 60.

Figure 2:
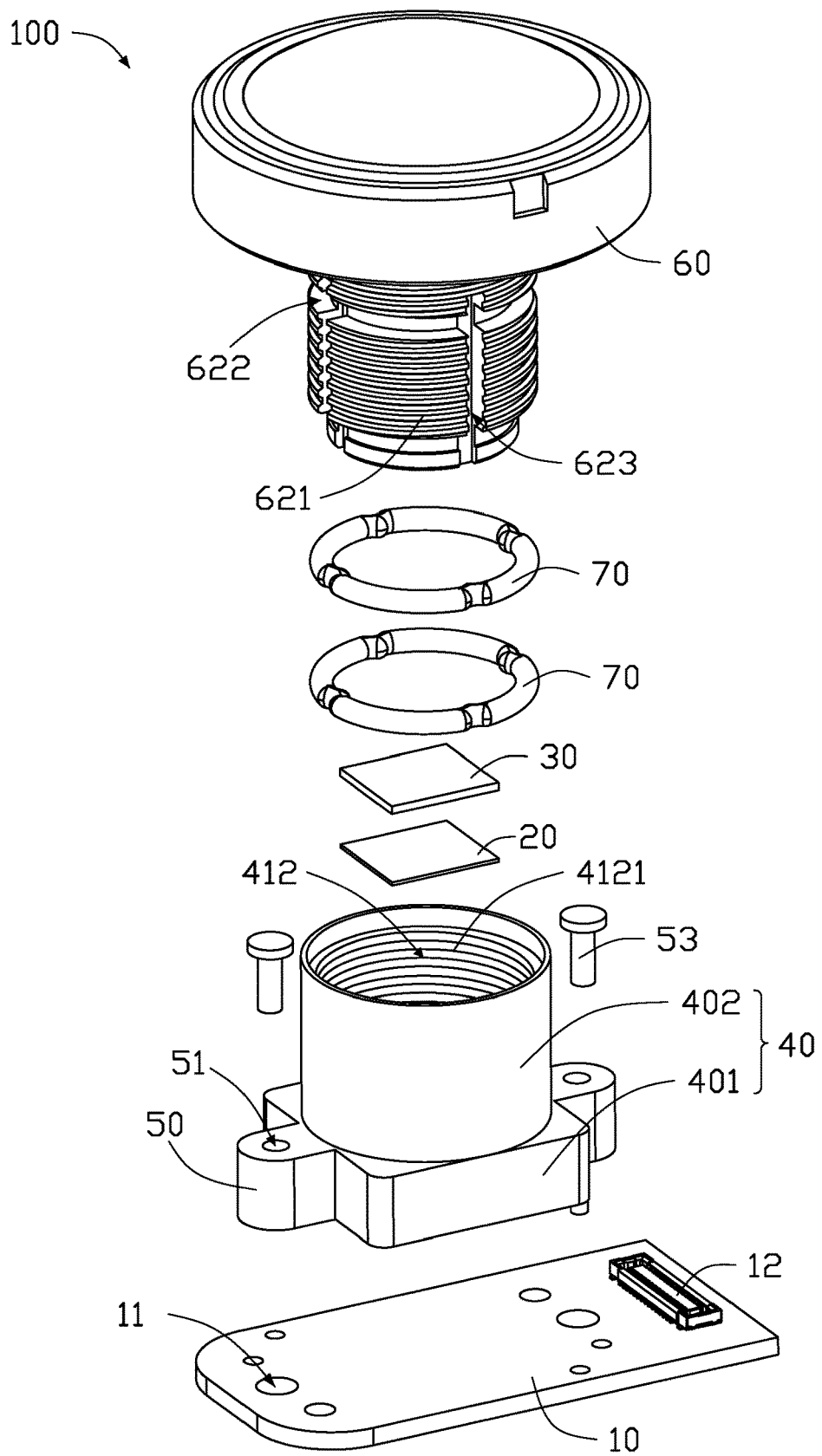
FIG. 2 is an exploded, diagrammatic view of the lens module of FIG. 1.

Referring to FIG. 2, in at least one embodiment, the circuit board 10 is a rigid circuit board. At least one first mounting hole 11 is defined on the circuit board 10 to pass through the circuit board 10. An electronic connecting element 12 is mounted on a surface of the circuit board 10. When the lens module 100 is applied to an electronic device 200 (shown in FIG. 6), the electronic connecting element 12 is configured to transmit signals between the lens module 100 and other components of the electronic device. In at least one embodiment, the electronic connecting element 12 may be a connector or a gold finger.

In another embodiment, the electronic connecting element 12 may be mounted on other area of the circuit board 10.

Figure 3:
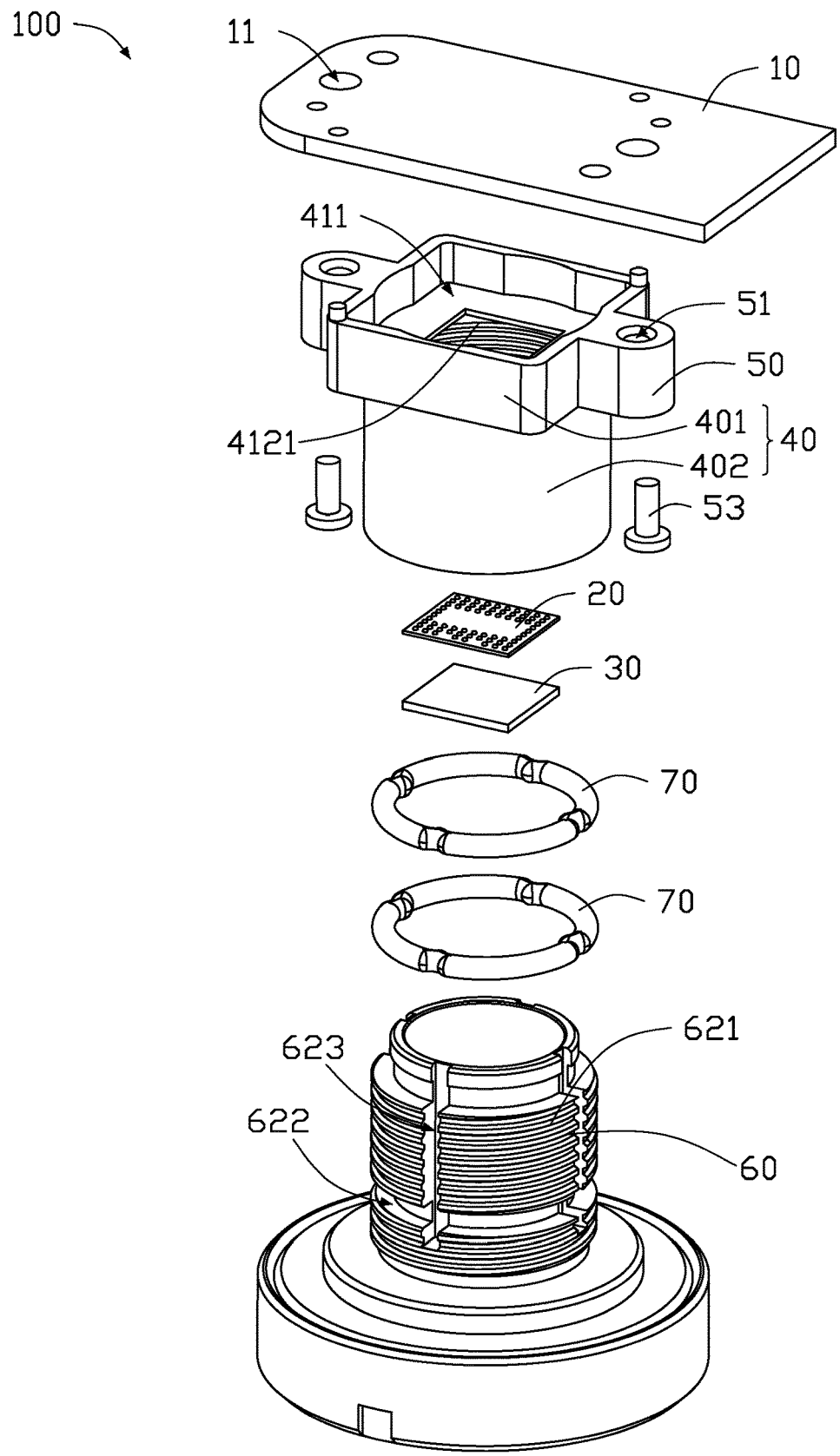
FIG. 3 is exploded, diagrammatic view of the lens module of FIG. 1 viewed from another angle.

Referring to FIG. 3, a photosensitive chip 20 (shown in FIG. 5 at the same time) is mounted on the circuit board 10. The photosensitive chip 20 and the electronic connecting element 12 may be mounted on a same surface of the circuit board 10.

The filter 30 (shown in FIG. 5 at the same time) is mounted on the photosensitive chip 20 and faces away from the circuit board 10. In at least one embodiment, the filter 30 may be rectangular.

Figure 4:
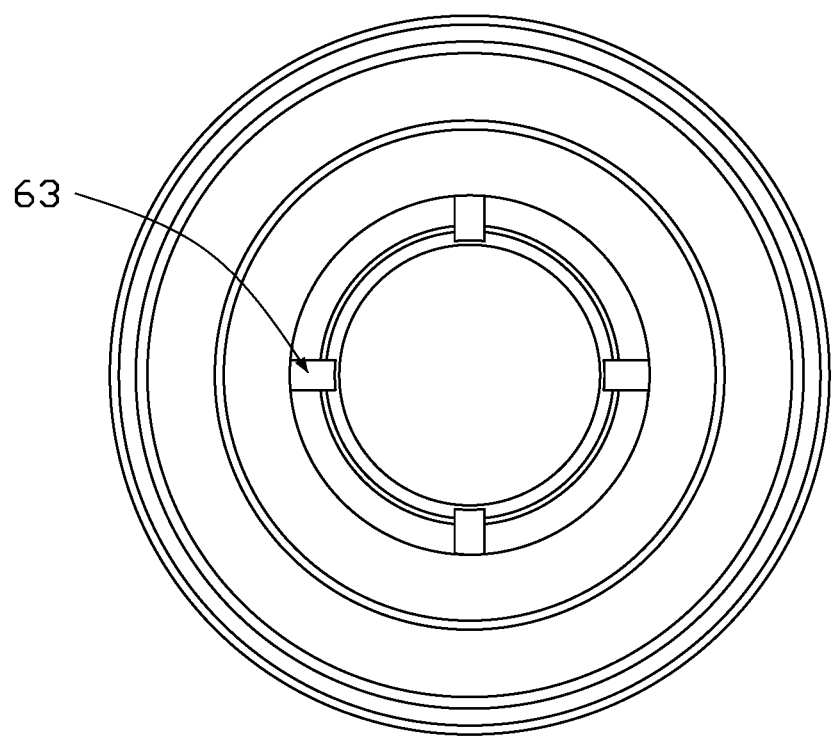
FIG. 4 is a diagram of an embodiment of a lens.
Figure 5:
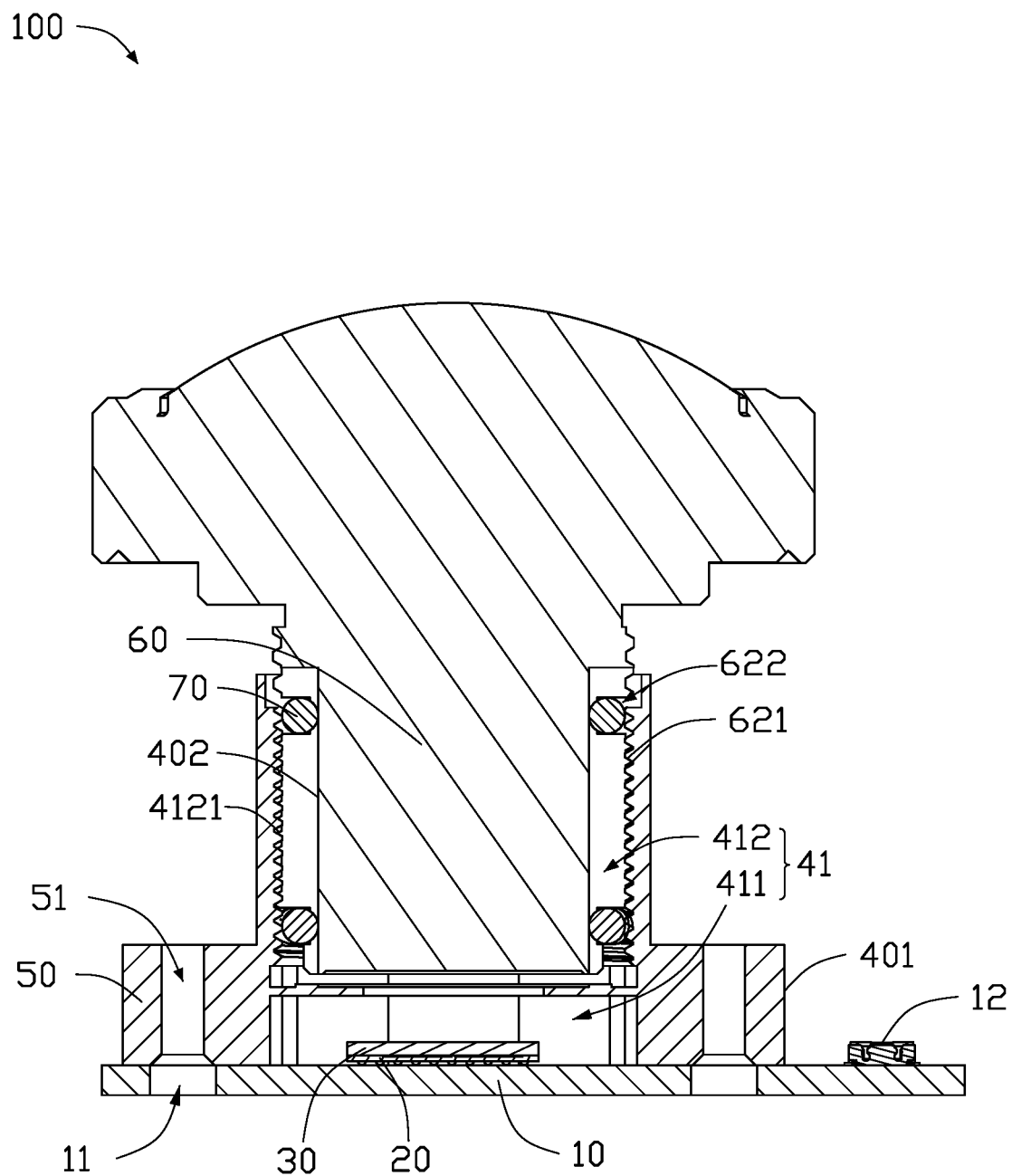
FIG. 5 is a cross-sectional view of the lens module taken along V-V line of FIG. 1.

Referring to FIGS. 4 and 5, the lens holder 40 is mounted on the surface of the circuit board 10. A through-hole 41 is defined to pass through the lens holder 40. In at least one embodiment, the lens holder 40 includes a first holding portion 401 and a second holding portion 402 connecting to the first holding portion 401. The through-hole 40 passes through the first holding portion 401 and the second holding portion 402. A side of the first holding portion 401 facing away from the second holding portion 402 is mounted on the circuit board 10.

In at least one embodiment, the first holding portion 401 may be a hollow cuboid, and the second holding portion 402 may be a hollow cylinder. A width of the first holding portion 401 is greater than a width of the second holding portion 402.

The through-hole 41 includes a first portion 411 and a second portion 412 communicating with the first portion 411. The first portion 411 passes through the first holding portion 401, the second portion 412 passes through the second holding portion 402. An inner wall of the first holding portion 401 surrounds to define the first portion 411. An inner wall of the second holding portion 402 surrounds to define the second portion 412. In at least one embodiment, the first portion 411 may be rectangular, and the second portion 412 may be cylindrical. A first thread 4121 is formed on the inner wall of the second holding portion 402. The filter 30 and the photosensitive chip 20 are received in the first portion 411, the lens 60 is received in the second portion 412.

At least one connecting structure 50 is formed on an outer sidewall of the first holding portion 401. A second mounting hole 51 corresponding to one first mounting hole 11 is defined on each connecting structure 50. In at least one embodiment, two connecting structure 50 are formed on the outer sidewall of the first holding portion 401, and face to each other.

A connecting element 53 (shown in FIG. 2) such as screw or bolt connects to the second mounting hole 51 and the first mounting hole 11 to fix the lens holder 40 on the circuit board 10. The lens holder 40 may be made of metal or plastic.

A portion of the lens 60 is received in the second portion 412 of the lens holder 40. A second thread 621 is formed on an outer sidewall of the lens 60. At least one first slot 622 is defined on the outer sidewall of the lens 60 and around a periphery of the lens 60. A seal ring 70 is received in each first slot 622. At least one second slot 623 is defined on the outer sidewall of the lens 60 along a direction of an optic axis of the lens 60. Each second slot 623 passes through each first slot 622 to define a receiving space 63. In at least one embodiment, the first slot 622 may be annular, and the second slot 623 may be linear. The first slot 622 is perpendicular to the second slot 623. The second thread 621 cooperates with the first thread 4121 to fix the lens 60 on the lens holder 40.

In at least one embodiment, the number of the first slot 622 is two, and two first slots 622 are spaced apart. The number of the second slot 623 is four, and four second slots 623 are equidistantly spaced apart. The seal ring 70 may be made of rubber.

When the lens is mounted on the lens holder 40, the seal ring 70 is deformed by pressing, and the receiving space 63 is used for accommodating the deformation of the seal ring 70, thereby avoiding a breakage of the seal ring 70, and reducing an instability of a torsion force of the lens 60. In addition, the second slot 623 can serve as a heat dissipating channel, thereby improving an imaging quality of the lens module 100.

Figure 6:
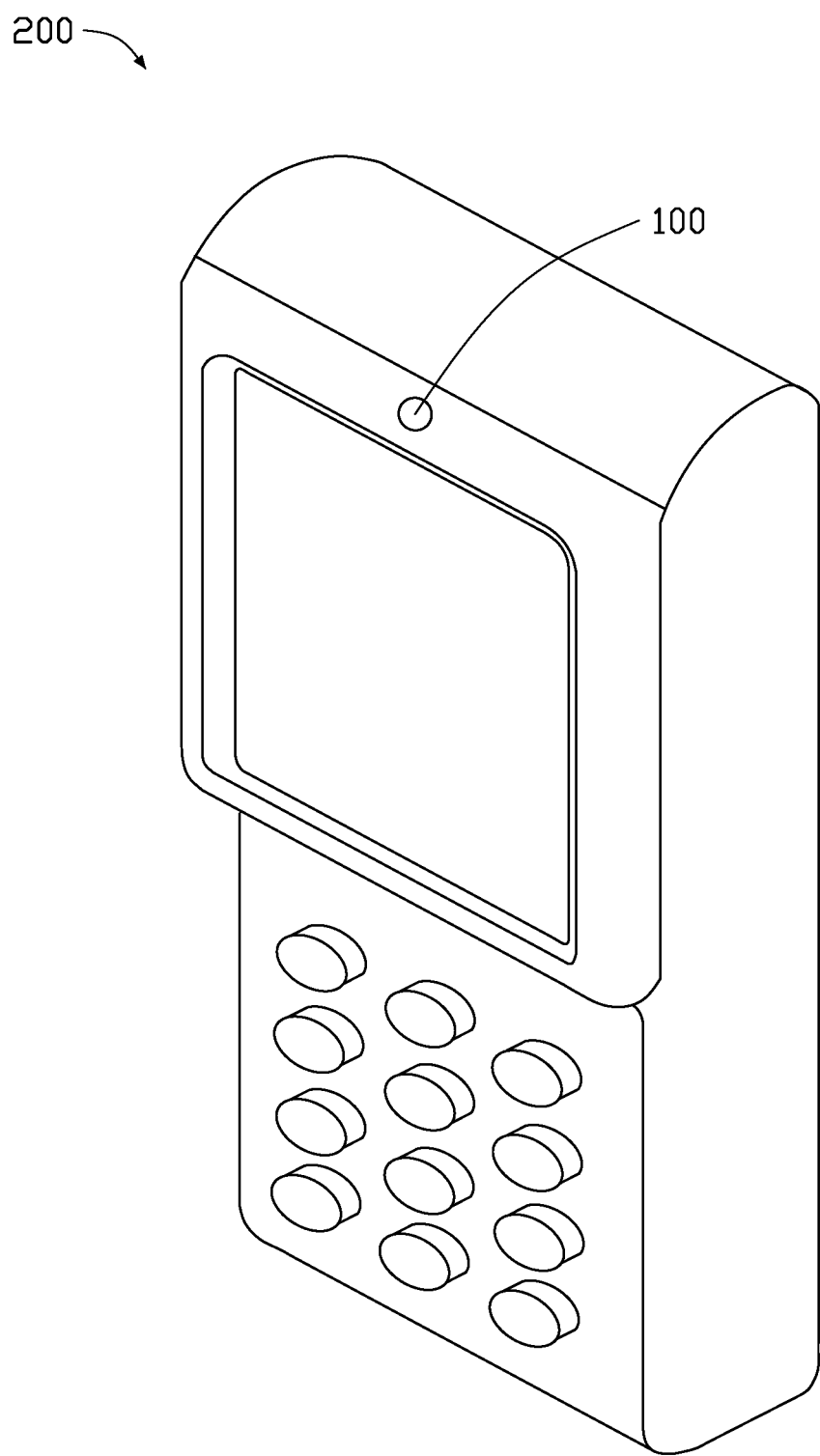
FIG. 6 is diagram of an embodiment of an electronic device having the lens module of FIG. 1.

Referring to FIG. 6, the lens module 100 can be used in an electronic device 200. The electronic device 200 can be a mobile phone, a laptop, a camera or others.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module comprising:
a lens holder comprising a through-hole; and
a lens mounted on the lens holder;
wherein the lens holder comprises an inner wall surrounding to define the through-hole, a first thread is formed on the inner wall, a second thread is formed on an outer sidewall of the lens, the first thread cooperates with the second thread to fix the lens on the lens holder; at least one first slot is defined on the outer sidewall of the lens and around a periphery of the lens, a seal ring is received in each of the at least one first slot, at least one second slot is defined on the outer sidewall of the lens along a direction of an optic axis of the lens, each of the at least one second slot passes through each of the first slot to form a receiving space; when the lens is mounted on the lens holder, the seal ring is deformed, and the receiving space is used for accommodating the deformation of the seal ring.

2. The lens module of claim 1, wherein the lens comprises two spaced first slots, and each of the first slots is annular.

3. The lens module of claim 1, wherein the lens comprises four second slots, the second slots are equidistantly spaced apart, and each of the second slots is linear.

4. The lens module of claim 1, wherein each of the at least one first slot is perpendicular to each of the at least one second slot.

5. The lens module of claim 1, wherein the lens module further comprises a circuit board, at least one first mounting hole is defined on the circuit board to pass through the circuit board, at least one second mounting hole is defined on the lens holder, each of the at least one second mounting hole corresponds to one of the at least one first mounting hole, a connecting element cooperates with the one of the at least one second mounting hole and the corresponding first mounting hole to fix the lens holder on the circuit board.

6. The lens module of claim 5, wherein the lens module further comprises a photosensitive chip mounted on the circuit board and received in the through-hole.

7. The lens module of claim 6, wherein the lens module further comprises a filter mounted on a surface of the photosensitive chip facing away from the circuit board, the filter is received in the through-hole.

8. The lens module of claim 7, wherein the lens holder further comprises a first holding portion mounting on the circuit board and a second holding portion connecting to the first holding portion, a width of the first holding portion is greater than a width of the second holding portion, the through-hole passes through the first holding portion and the second holding portion.

9. The lens module of claim 8, wherein the through-hole comprises a first portion and a second portion communicating with the first portion, the first portion passes through the first holding portion, the second portion passes through the second holding portion, an inner wall of the first holding portion surrounds to define the first portion, an inner wall of the second holding portion surrounds to define the second portion, the first thread is formed on the inner wall of the second holding portion, the photosensitive chip and the filter are received in the first portion.

10. The lens module of claim 1, wherein the seal ring is made of rubber.

11. An electronic device comprising:
a lens module comprising:
a lens holder comprising a through-hole; and
a lens mounted on the lens holder;
wherein the lens holder comprises an inner wall surrounding to define the through-hole, a first thread is formed on the inner wall, a second thread is formed on an outer sidewall of the lens, the first thread cooperates with the second thread to fix the lens on the lens holder; at least one first slot is defined on the outer sidewall of the lens and around a periphery of the lens, a seal ring is received in each of the at least one first slot, at least one second slot is defined on the outer sidewall of the lens along a direction of an optic axis of the lens, each of the at least one second slot passes through each of the first slot to form a receiving space; when the lens is mounted on the lens holder, the seal ring is deformed, and the receiving space is used for accommodating the deformation of the seal ring.

12. The electronic device of claim 11, wherein the lens comprises two spaced first slots, and each of the first slots is annular.

13. The electronic device of claim 11, wherein the lens comprises four second slots, the second slots are equidistantly spaced apart, and each of the second slots is linear.

14. The electronic device of claim 13, wherein each of the at least one first slot is perpendicular to each of the at least one second slot.

15. The electronic device of claim 11, wherein the lens module further comprises a circuit board, at least one first mounting hole is defined on the circuit board to pass through the circuit board, at least one second mounting hole is defined on the lens holder, each of the at least one second mounting hole corresponds to one of the at least one first mounting hole, a connecting element cooperates with the one of the at least one second mounting hole and the corresponding first mounting hole to fix the lens holder on the circuit board.

16. The electronic device of claim 15, wherein the lens module further comprises a photosensitive chip mounted on the circuit board and received in the through-hole.

17. The electronic device of claim 16, wherein the lens module further comprises a filter mounted on a surface of the photosensitive chip facing away from the circuit board, the filter is received in the through-hole.

18. The electronic device of claim 17, wherein the lens holder further comprises a first holding portion mounting on the circuit board and a second holding portion connecting to the first holding portion, a width of the first holding portion is greater than a width of the second holding portion, the through-hole passes through the first holding portion and the second holding portion.

19. The electronic device of claim 18, wherein the through-hole comprises a first portion and a second portion communicating with the first portion, the first portion passes through the first holding portion, the second portion passes through the second holding portion, an inner wall of the first holding portion surrounds to define the first portion, an inner wall of the second holding portion surrounds to define the second portion, the first thread is formed on the inner wall of the second holding portion, the photosensitive chip and the filter are received in the first portion.

20. The electronic device of claim 11, wherein the seal ring is made of rubber.

* * * * *